United States Patent [19]

Ohno et al.

[11] Patent Number: 5,363,197
[45] Date of Patent: Nov. 8, 1994

[54] COLORIMETER FOR COLOR DISPLAYS

[75] Inventors: Yoshihiro Ohno, Rockville, Md.; Rie Suzuki, Hirakata, Japan

[73] Assignee: Matsushita Electric Industrial Co., Ltd., Osaka, Japan

[21] Appl. No.: 869,657

[22] Filed: Apr. 16, 1992

[30] Foreign Application Priority Data

Apr. 19, 1991 [JP] Japan .................... 3-088188

[51] Int. Cl.$^5$ .................................... G01J 3/50
[52] U.S. Cl. .................................... 356/405; 356/406; 364/526; 348/179; 348/189
[58] Field of Search .................... 356/405, 406, 407; 364/571.02, 526; 358/10

[56] References Cited

U.S. PATENT DOCUMENTS

4,989,982  2/1991  Osaki et al. .................... 364/526

Primary Examiner—F. L. Evans
Assistant Examiner—Peter J. Rashid
Attorney, Agent, or Firm—Ratner & Prestia

[57] ABSTRACT

A tristimulus colorimeter for color displays is required to remove measurement errors caused by deviations of the spectral responsivities thereof from the color matching functions. The colorimeter is provided with a light receiving unit having spectral responsivities close to the color matching functions, a tristimulus values operation unit for performing operations to calculate tristimulus values, and a chromaticity operation unit for performing operations to calculate a chromaticity. The colorimeter is further provided with a spectral distribution storage unit for storing spectral distributions of representative colored lights, a mixing ratio operation unit for performing operations to calculate a mixing ratio of a mixed light including colored lights of red, green, and blue. The colorimeter is also provided with a spectral distribution operation unit and a corrected chromaticity operation unit. The spectral distribution operation unit performs operations to calculate a spectral distribution of the mixed light while the corrected chromaticity operation unit performs operations to calculate a corrected chromaticity of the mixed light.

10 Claims, 3 Drawing Sheets

COLORIMETER FOR COLOR DISPLAYS

BACKGROUND OF THE INVENTION

1. Field of the Invention

The present invention relates generally to a colorimeter for color displays and more particularly to a high accuracy colorimeter capable of correcting measurement errors caused by deviations of the spectral responsivities of a light receiving unit from the color matching functions.

2. Description of the Prior Art

Tristimulus colorimeters, hereinafter referred to simply as colorimeters, are in wide practical use today as instruments capable of easily measuring the color of a light source. In the colorimeters, however, measurement errors caused by deviations of the spectral responsivities thereof from the color matching functions $\bar{x}(\lambda)$, $\bar{y}(\lambda)$, and $\bar{z}(\lambda)$ are unavoidable. The larger the difference between the spectral distribution (chromaticity) of a light source used for calibration and that of a light source to be measured is, the larger the measurement errors become. Accordingly, if a colorimeter is calibrated by the use of a single reference light source such as, for example, an incandescent lamp, the kind of light sources to be measured to which measurements can be performed with sufficiently high accuracy is limited. In other words, the range of chromaticity in which the accuracy is sufficiently high is limited to a certain range in the proximity of the point of chromaticity of the reference light source.

To solve this problem, a plurality of reference light sources have hitherto been prepared for a single colorimeter and calibration has been performed upon selection of a reference light source of the type close to a light source to be measured. This method, however, is extremely inconvenient because it requires many reference light sources and the calibration prior to measurements. To improve this, a method is known in which correction is performed upon selection of an appropriate calibration factor from among a plurality of calibration factors in compliance with the kind or the measured value in chromaticity of a light source to be measured. In this case, the calibration is performed in advance by the use of a plurality of reference light sources and the calibration factors are stored in a colorimeter.

Even in this kind of correction method, not only the calibration by the use of the plurality of light sources is a considerably time-consuming work but also the number of the reference light sources for use in calibration is still limited. Accordingly, sufficient correction cannot be performed with respect to light sources having respective chromaticities apart from the points of chromaticity of the reference light sources.

Furthermore, a method of performing correction from the coordinate of a point of chromaticity measured is known but cannot sufficiently correct errors. The reason for this is that light sources having the same chromaticity are not always the same in spectral distribution and errors in chromaticity measurements differ according to the difference in spectral distribution.

Particularly, in the measurements of lights emitted from color displays such as CRTs, the chromaticity thereof greatly changes according to the mixing ratio of the three primary colors of red, green, and blue. Accordingly, in order to perform high accuracy measurements, it is necessary to prepare reference lights of the three primary colors or a white light obtained by mixing these lights at a given ratio so that calibration may be performed upon selection of an appropriate reference light according to the color of a light to be measured (color temperatures of respective colored lights in the case of the white light). Otherwise, a plurality of colorimeters are required for respective colored lights only. Even in applications where such reference lights or colorimeters are prepared, measurements cannot be performed with sufficient accuracy in the range of chromaticity positioned between the points of chromaticity of the reference lights.

In addition, there are many colorimeters having a function of simultaneously measuring not only the chromaticity or the color temperature of a light to be measured but the photometric quantity such, for example, as the illuminance or luminance by making use of outputs from a light receiving unit close to $\bar{y}(\lambda)$ of the color matching functions i.e., the spectral luminous efficiency of the standard photometric observer. The spectral responsivities of the light receiving unit close to $\bar{y}(\lambda)$, however, always include deviations from the spectral luminous efficiency. Accordingly, if a light to be measured differ in spectral distribution from a light source used for calibration, there arise heterochromatic photometry errors. In particular, when the photometric quantity of colored lights emitted from a color display or the like is measured by a colorimeter calibrated by the use of a white light emitted from, for example, a reference incandescent lamp, measurement errors become considerably large. Up to this time, however, there are no colorimeters capable of automatically correcting such heterochromatic photometry errors.

SUMMARY OF THE INVENTION

The present invention has been developed to overcome the above-described disadvantages.

It is accordingly an object of the present invention to provide an improved colorimeter capable of effectively correcting measurement errors in chromaticity or photometric quantity caused by deviations of the spectral responsivities of a light receiving unit from the color matching functions. This colorimeter is intended to be used with respect to color displays from which is emitted a mixed light of the three primary colors of red, green, and blue.

In accomplishing this and other objects, a colorimeter according to the present invention comprises: a light receiving means having three kinds of spectral responsivities close to the color matching functions; a tristimulus values operation means for performing operations required to calculate tristimulus values based on outputs from the light receiving means; a chromaticity operation means for performing operations required to calculate a chromaticity based on outputs from the tristimulus values operation means; a spectral distribution storage means for storing spectral distributions of representative colored lights of red, green, and blue; a mixing ratio operation means for performing operations required to calculate a mixing ratio of a mixed light including colored lights of red, green, and blue and mixed at an arbitrary ratio based on outputs from the chromaticity operation means at the time the mixed light is received by the light receiving means and outputs from the tristimulus values operation means at the time the representative colored lights of red, green, and blue are individually received by the light receiving means; a spectral distribution operation means for performing operations required to calculate a spectral distribution of the mixed light based on outputs from the mixing ratio operation means and outputs from the spectral distribution storage means; and a corrected chromaticity operation means for performing operations required to calculate a corrected chromaticity of the mixed light based on outputs from the spectral distribution operation means.

By this organization, it is not necessary to know the spectral responsivities of the light receiving means and it is sufficient if the representative colored lights and the spectral distribution data thereof are prepared in advance which are close to the spectral distributions of the colored lights constituting the mixed light. When the colorimeter is calibrated by the use of such representative colored lights, the chromaticity of the light to be measured can be determined with accuracy irrespective of the mixing ratio of the colored lights.

The colorimeter may further comprise a spectral responsivity storage means for storing the spectral responsivities of the light receiving means and a measured tristimulus values operation means for performing operations required to calculate measured tristimulus values of the representative colored lights of red, green, and blue based on outputs from the spectral responsivity storage means and the outputs from the spectral distribution storage means. In this case, outputs from the measured tristimulus values operation means and those from the chromaticity operation means are inputted into the mixing ratio operation means.

This organization requires no actual light sources for emitting the representative colored lights and can correct measurement errors caused by deviations of the spectral responsivities of the light receiving means from the color matching functions, even if the mixing ratio of the colored lights is arbitrarily changed.

Furthermore, the colorimeter may comprise a photometric quantity operation means for outputting a photometric quantity based on the outputs from the light receiving means, a color correction factor operation means for performing operations required to calculate a color correction factor of outputs of the photometric quantity operation means with respect to the mixed light based on the outputs from the spectral distribution operation means and the outputs from the spectral responsivity storage means, and a photometric quantity correction means for correcting the outputs from the photometric quantity operation means by the use of outputs from the color correction factor operation means.

This organization provides a function for automatically calculating the color correction factor of the photometric quantity.

In another aspect of the present invention, a colorimeter comprises: a light receiving means having three different spectral responsivities; a spectral distribution storage means for storing spectral distributions of representative colored lights of red, green, and blue: a mixing ratio operation means for performing operations required to calculate a mixing ratio of a mixed light including colored lights of red, green, and blue and mixed at an arbitrary ratio based on outputs from the light receiving means at the time the mixed light is received by the light receiving means and outputs from the light receiving means at the time the representative colored lights of red, green, and blue are individually received by the light receiving means; a spectral distribution operation means for performing operations required to calculate a spectral distribution of the mixed light based on outputs from the mixing ratio operation means and outputs from the spectral distribution storage means; and a corrected chromaticity operation means for performing operations required to calculate a corrected chromaticity of the mixed light based on outputs from the spectral distribution operation means.

In this organization, it is not necessary to make the spectral responsivities of the light receiving means close to the color matching functions.

BRIEF DESCRIPTION OF THE DRAWINGS

This and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 1:
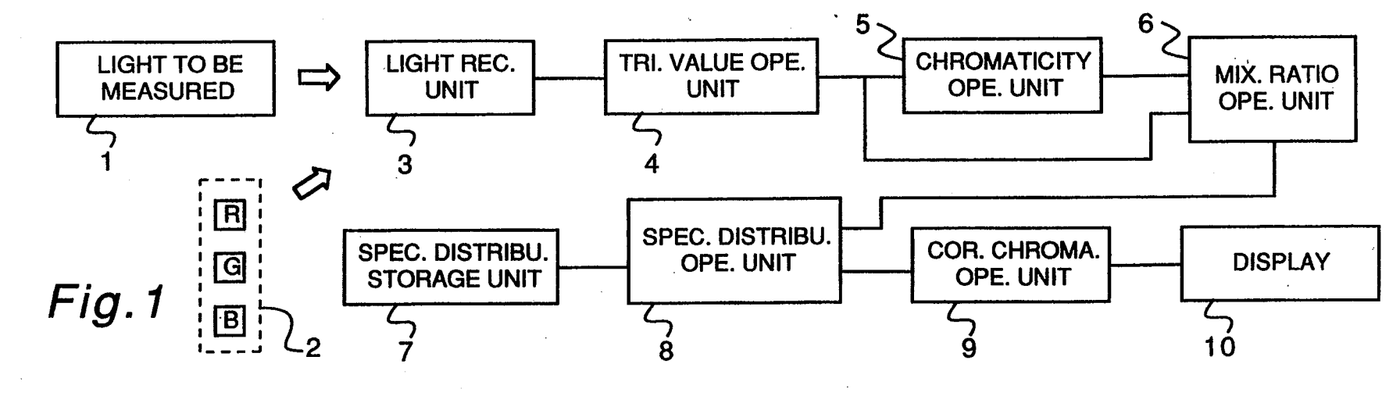
FIG. 1 is a block diagram of a colorimeter according to a first embodiment of the present invention.

Referring now to the drawings, there is schematically shown in FIG. 1 the organization of a colorimeter according to a first embodiment of the present invention. A light 1 to be measured is a mixed light obtained by mixing colored lights of the three primary colors of red, green, and blue at a certain ratio. A light emitted from a color CRT is one example of the mixed light. Representative lights 2 are colored lights representative of the three primary colors of red, green, and blue. A light receiving unit 3 comprises three light receiving elements having respective spectral responsivities close to the color matching functions $\bar{x}(\lambda)$, $\bar{y}(\lambda)$, and $\bar{z}(\lambda)$. The mixed light 1 or the representative colored lights 2 are initially received by the light receiving unit 3 and are converted into electric signals. Thereafter, output signals $I_1$, $I_2$, and $I_3$ from the light receiving elements are converted into digital signals, which are then outputted from the light receiving unit 3. A tristimulus values operation unit 4 receives outputs from the light receiving unit 3 and performs the following operations to calculate the tristimulus values X, Y, and Z of the light 1 to be measured.

$$X = k_1 I_1$$
$$Y = k_2 I_2$$
$$Z = k_3 I_3 \tag{1}$$

where $k_1$, $k_2$, and $k_3$ are values determined so that a correct chromaticity may be obtained at the time a certain reference light is measured.

A chromaticity operation unit 5 performs the following operations to calculate the chromaticity (x, y) of the light 1 to be measured.

$$x = X/(X+Y+Z)$$

$$y = Y/(X+Y+Z) \quad (2)$$

However, the spectral responsivities of the light receiving unit 3 always include deviations from the color matching functions. Because of this, when a light is measured that has a spectral distribution different from that of the reference light used for calibration (determination of $k_1$, $k_2$, $k_3$) of the colorimeter, the values of X, Y, and Z and those of x and y always include errors.

The same is true for the ordinary colorimeters. The above measurement errors are corrected based on the following principle.

Let the spectral distributions of the lights of the three primary colors of red, green, and blue constituting the mixed light 1 be $P_R(\lambda)$, $P_G(\lambda)$, and $P_B(\lambda)$, respectively, and let the mixing ratio of these lights be $1:C_1:C_2$. When measurements are performed with respect to the mixed light, the measured value (x, y) in chromaticity i.e., the outputs from the chromaticity operation unit 5 is given by:

$$x = (X_R + C_1 X_G + C_2 X_B)/\alpha$$

$$y = (Y_R + C_1 Y_G + C_2 Y_B)/\alpha$$

$$\alpha = (X_R + Y_R + Z_R) + C_1(X_G + Y_G + Z_G) + C_2(X_B + Y_B + Z_B) \quad (3)$$

where $(X_R, Y_R, Z_R)$, $(X_G, Y_G, Z_G)$, and $(X_B, Y_B, Z_B)$ are tristimulus values measured (outputs from the tristimulus values operation unit 4) at the time measurements are performed upon independently emitting each colored light of red, green, and blue. Accordingly, when these equations are solved as simultaneous equations including the unknowns $C_1$ and $C_2$, the mixing ratio of the colored lights constituting the mixed light 1 can be determined.

However, each of the colored lights is not always emitted independently. Because of this, colored lights considerably close in spectral distribution to the colored lights constituting the mixed light 1 (the light to be measured) should be prepared as the representative colored lights 2. Upon measurement of the representative colored light 2, the tristimulus values $(X_R, Y_R, Z_R)$, $(X_G, Y_G, Z_G)$, and $(X_B, Y_B, Z_B)$ are obtained. If each of the colored lights constituting the mixed light 1 can be emitted individually and measurements can be performed with respect to thereto in place of the representative colored lights 2, there are theoretically no errors. A mixing ratio operation unit 6 performs the above operations to determine $C_1$ and $C_2$.

When the unknowns $C_1$ and $C_2$ are determined, the spectral distribution $P_{RGB}(\lambda)$ of the mixed light 1 is calculated by the following equation based on the spectral distributions $P_R(\lambda)$, $P_G(\lambda)$, and $P_B(\lambda)$ of the representative colored lights 2 (red, green, and blue) stored in a spectral distribution storage unit 7.

$$P_{RGB}(\lambda) = P_R(\lambda) + C_1 P_G(\lambda) + C_2 P_B(\lambda) \quad (4)$$

This operation is performed in a spectral distribution operation unit 8. Upon determination of the spectral distribution $P_{RGB}(\lambda)$ of the mixed light 1, a corrected chromaticity operation unit 9 determines the chromaticity (x, y) of the mixed light 1 by:

$$x = X_{RBG}/(X_{RGB} + Y_{RGB} + Z_{RGB})$$

$$y = Y_{RGB}/(X_{RGB} + Y_{RGB} + Z_{RGB}), \quad (5)$$

where $$X_{RGB} = \int_0^\infty P_{RGB}(\lambda) \bar{x}(\lambda) d\lambda$$

$$Y_{RGB} = \int_0^\infty P_{RGB}(\lambda) \bar{y}(\lambda) d\lambda$$

$$Z_{RGB} = \int_0^\infty P_{RGB}(\lambda) \bar{z}(\lambda) d\lambda$$

Note: $\bar{x}(\lambda)$, $\bar{y}(\lambda)$, and $\bar{z}(\lambda)$ are the color matching functions. Thereafter, the chromaticity (x, y) of the mixed light 1 is displayed on a display 10. In the operations for the above equations (4) and (5), if the spectral distributions of the representative colored lights 2 and those of colored lights constituting the mixed light 1 differ, there arise errors. However, these errors can be significantly reduced by making use of spectral distribution data of the representative colored lights 2 sufficiently close to the spectral distributions of the colored lights constituting the mixed light 1.

In this embodiment, it is not necessary to know the spectral responsivities of the light receiving unit 3 and it is sufficient if the representative colored lights and the spectral distribution data thereof are prepared in advance which are close to the spectral distributions of the colored lights constituting the mixed light i.e., the light to be measured. When the colorimeter is calibrated by the use of such representative colored lights, the chromaticity of the light to be measured can be determined with accuracy throughout the full range in which the colors can be reproduced, even if the mixing ratio of the colored lights is arbitrarily changed. In the method according to this embodiment, if the spectral distributions of the representative colored lights perfectly coincide with those of the colored lights constituting the light to be measured, it is theoretically possible to completely remove errors caused by deviations of the spectral responsivities of the light receiving unit 3 from the color matching functions.

If the spectral distributions of the representative colored lights slightly differ from those of the colored lights constituting the light to be measured, error correction cannot be made perfectly. However, large part of the error can be removed, and the error correction is still effective, so long as the spectral distributions do not differ significantly.

Figure 2:
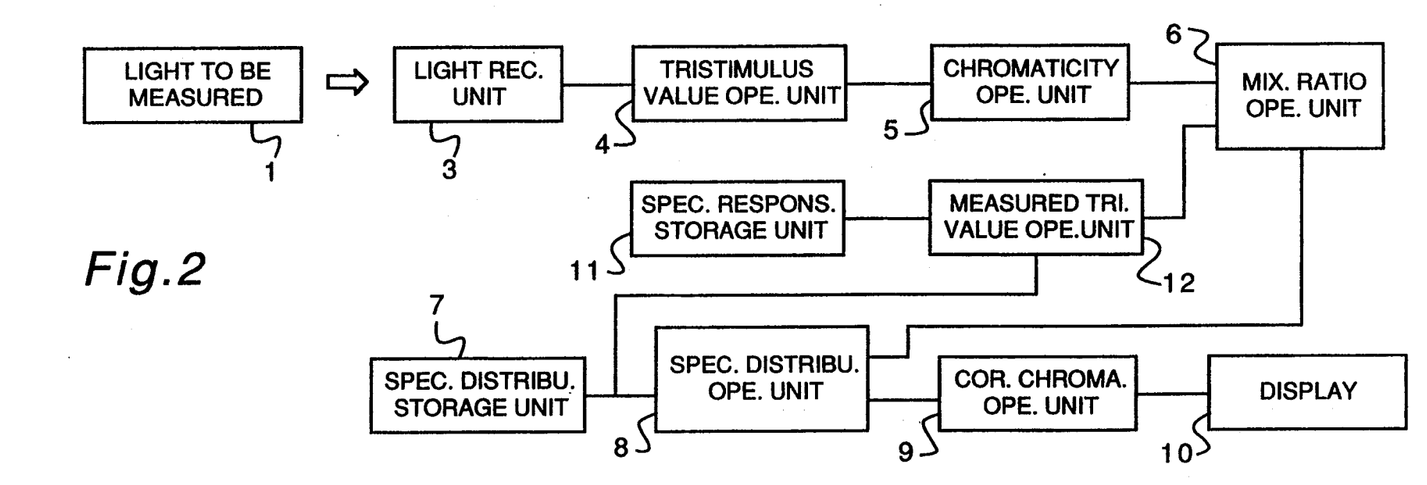
FIG. 2 is a diagram similar to FIG. 1 according to a second embodiment of the present invention.

FIG. 2 schematically depicts the organization of a colorimeter according to a second embodiment of the present invention. This colorimeter does not require the representative colored lights and is provided with a spectral responsivity storage unit 11 and a measured tristimulus values operation unit 12. Whereas, in the first embodiment, the unknowns $C_1$ and $C_2$ are determined based on the tristimulus values $(X_R, Y_R, Z_R)$, $(X_G, Y_G, Z_G)$, and $(X_B, Y_B, Z_B)$ of the colored lights obtained by the measurements of the representative colored lights, these unknowns are determined by calculations in the second embodiment. More specifically, the spectral responsivities $x(\lambda)$, $y(\lambda)$, and $z(\lambda)$ of the light receiving elements of the light receiving unit 3 are stored in the spectral responsivity storage unit 11. From these data and the spectral distributions $P_R(\lambda)$, $P_G(\lambda)$, and $P_B(\lambda)$ of the representative colored lights stored in the spectral distribution storage unit 7, the tristimulus values of the representative colored lights are calculated by:

$$X_R = \int_0^\infty P_R(\lambda)x(\lambda)d\lambda \qquad (6)$$

$$Y_R = \int_0^\infty P_R(\lambda)y(\lambda)d\lambda$$

$$Z_R = \int_0^\infty P_R(\lambda)z(\lambda)d\lambda$$

$$X_G = \int_0^\infty P_G(\lambda)x(\lambda)d\lambda$$

$$Y_G = \int_0^\infty P_G(\lambda)y(\lambda)d\lambda$$

$$Z_G = \int_0^\infty P_G(\lambda)z(\lambda)d\lambda$$

$$X_B = \int_0^\infty P_B(\lambda)x(\lambda)d\lambda$$

$$Y_B = \int_0^\infty P_B(\lambda)y(\lambda)d\lambda$$

$$Z_B = \int_0^\infty P_B(\lambda)z(\lambda)d\lambda$$

These operations are performed by the measured tristimulus values operation unit 12. Then, the mixing ratio operation unit 6 performs operations required to calculate $C_1$ and $C_2$ from the equation (3). Thereafter, the corrected chromaticity (x, y) is calculated in the same manner as in the first embodiment.

In this embodiment also, even if the mixing ratio of the colored lights is arbitrarily changed, the chromaticity of the light to be measured can be determined with accuracy throughout the full reproducible color range by calculations in which are used the spectral responsivity data of the light receiving unit 3 measured in advance and stored in the spectral responsivity storage unit 11 or any other suitable data. In the method according to this embodiment, if the spectral distribution data of the representative colored lights stored in the spectral distribution storage unit 7 and the spectral distributions of the colored lights constituting the mixed light 1 coincide with each other, it is theoretically possible to completely remove errors caused by deviations of the spectral responsivities of the light receiving unit 3 from the color matching functions.

If the spectral distributions are slightly different from each other, the error correction in this embodiment cannot be perfect, but still sufficiently effective.

Figure 3:
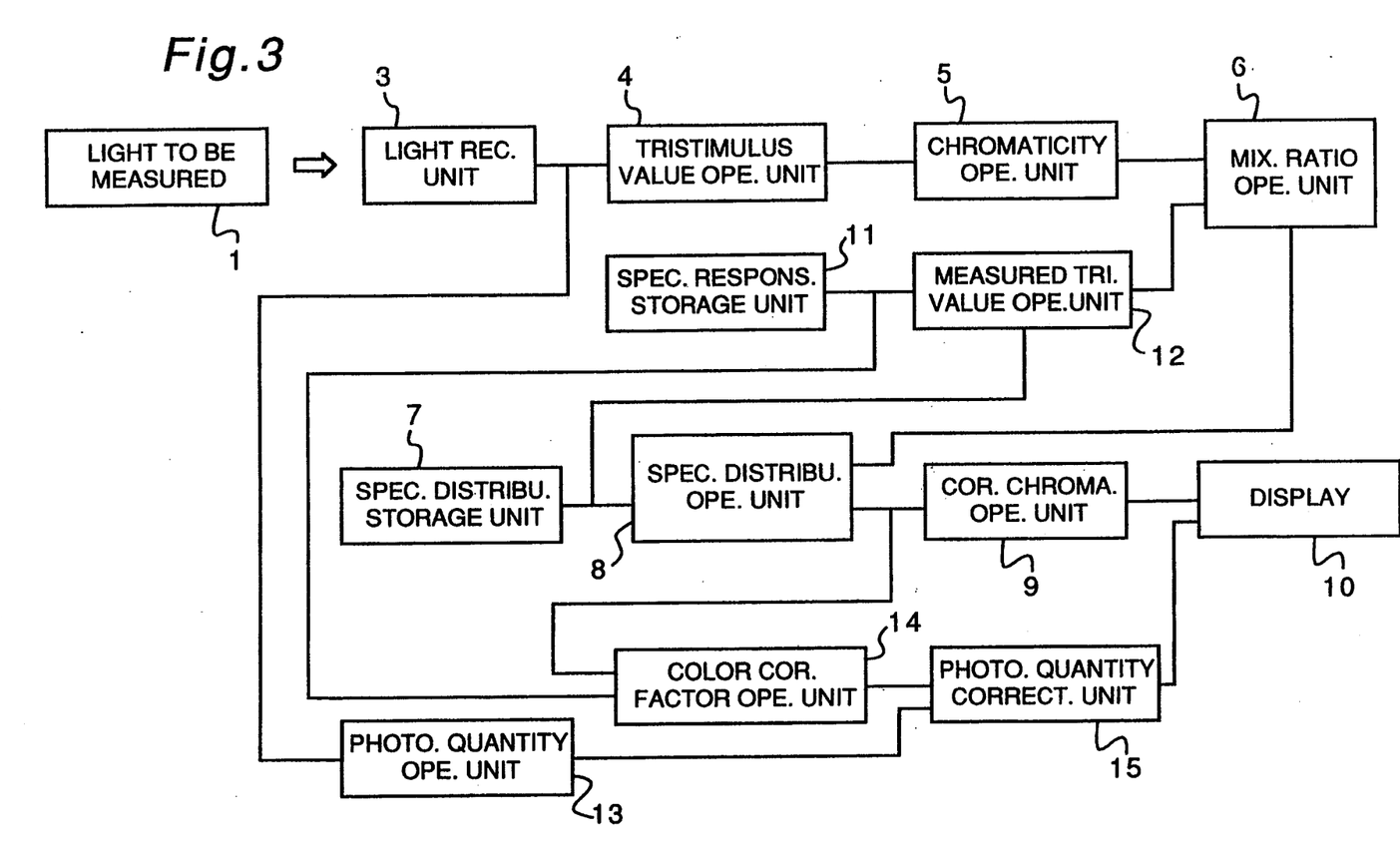
FIG. 3 is a diagram similar to FIG. 1 according to a third embodiment of the present invention.

FIG. 3 schematically depicts the organization of a colorimeter according to a third embodiment of the present invention, which is provided with a photometric quantity operation unit 13, a color correction factor operation unit 14, and a photometric quantity correction unit 15 in addition to the units constituting the colorimeter according to the second embodiment of the present invention. Because of this, the colorimeter according to this embodiment has an additional function for measuring the photometric quantity of which heterochromatic photometry errors are corrected.

As shown in FIG. 3, an output $I_2$ of a light receiving element close to $\bar{y}(\lambda)$ in the light receiving unit 3 i.e., the spectral luminous efficiency of the standard photometric observer is inputted into the photometric quantity operation unit 13, which determines the photometric quantity by multiplying 12 by a calibration factor $k_0$. The calibration factor $k_0$ is a factor determined so that the correct photometric quantity (illuminance or luminance) may be obtained with respect to a calibration light source. However, because the spectral responsivities of the light receiving elements include respective deviations from the spectral luminous efficiency, there arise heterochromatic photometry errors at the time a light source different in spectral distribution from the calibration light source is measured. The factor required for correcting these errors is known as the "color correction factor". Because the spectral distribution $P_{RGB}(\lambda)$ of the mixed light 1 to be measured is determined by the spectral distribution operation unit 8 as being given by the equation (4) and the spectral responsivity $y(\lambda)$ of the above light receiving element is stored in the spectral responsivity storage unit 11, the color correction factor $k_{RGB}$ with respect to the mixed light 1 is expressed by:

$$k_{RGB} = \frac{\int_0^\infty P_A(\lambda)\bar{y}(\lambda)d\lambda}{\int_0^\infty P_A(\lambda)y(\lambda)d\lambda} \times \frac{\int_0^\infty P_{RGB}(\lambda)y(\lambda)d\lambda}{\int_0^\infty P_{RGB}(\lambda)\bar{y}(\lambda)d\lambda} \qquad (7)$$

where $P_A(\lambda)$ is the spectral distribution of the calibration light source. This operation is performed by the color correction factor operation unit 14 on condition that data of $\bar{y}(\lambda)$ are stored in the color correction factor operation unit 14. The photometric quantity correction unit 15 multiplies an output from the photometric quantity operation unit 13 by the color correction factor $k_{RGB}$ determined in this way, thereby calculating the photometric quantity of which heterochromatic photometry errors are corrected with respect to the mixed light 1. The photometric quantity is then displayed on the display 10.

The colorimeter according to this embodiment also has the function for measuring the chromaticity of the mixed light with accuracy and is capable of automatically calculating the color correction factor of the photometric quantity with respect to the mixed light irrespective of the mixing ratio. Accordingly, the chromaticity and the photometric quantity of the light to be measured can be determined with accuracy throughout the full reproducible color range.

Figure 4:
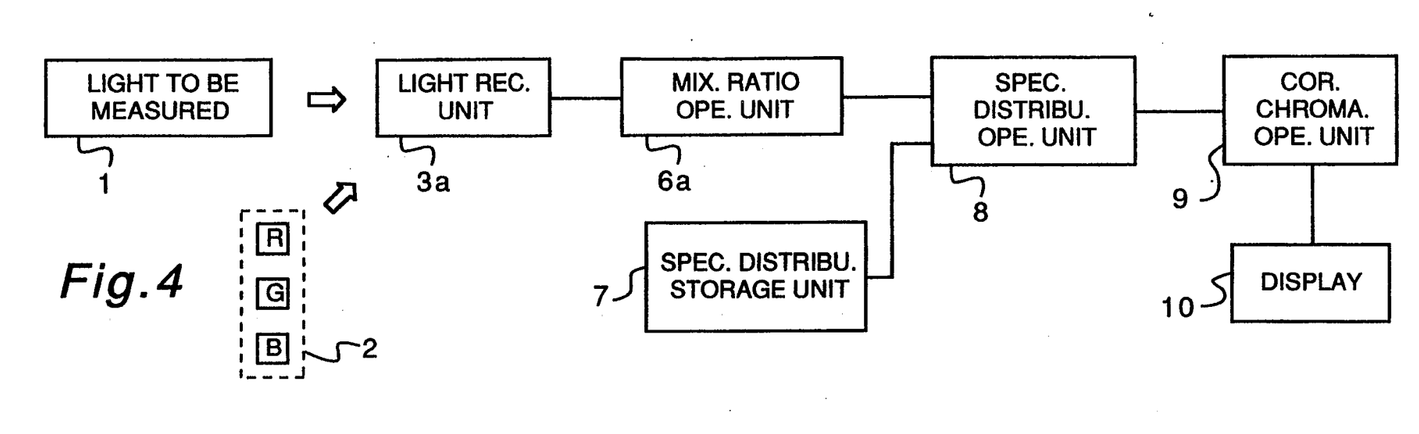
FIG. 4 is a diagram similar to FIG. 1 according to a fourth embodiment of the present invention.

FIG. 4 schematically depicts the organization of a colorimeter according to a fourth embodiment of the present invention. As is the case with the first embodiment shown in FIG. 1, this colorimeter also requires the representative colored lights 2 and is provided with a spectral distribution storage unit 7, a spectral distribution operation unit 8, a corrected chromaticity operation unit 9, and a display 10. However, a light receiving unit 3a and a mixing ratio operation unit 6a of the colorimeter shown in FIG. 4 differ from those of the colorimeter shown in FIG. 1.

In the first, second and third embodiments, the spectral responsivities of the light receiving unit 3 are rendered to be close to the color matching functions. It is, however, very difficult to manufacture such a light receiving unit. Accordingly, in the fourth embodiment, the chromaticity of the mixed light 1 is measured by the use of the light receiving unit 3a having arbitrarily selected three different spectral responsivities, which are not rendered to be close to the color matching functions.

In FIG. 4, the mixed light 1 i.e., the light to be measured includes colored lights of red, green, and blue. The representative colored lights 2 can be emitted independently and are colored lights constituting the mixed light 1 or those having respective spectral distributions close thereto. The spectral distributions $P_R(\lambda)$, $P_G(\lambda)$, and $P_B(\lambda)$ of the representative colored lights 2 are stored in the spectral distribution storage unit 7. The representative colored lights 2 are emitted at a ratio of intensity proportional to the values of $P_R(\lambda)$, $P_G(\lambda)$, and $P_B(\lambda)$ stored.

When the representative colored lights are mixed at a ratio of $1:C_1:C_2$ and outputs of the light receiving elements of the light receiving unit 3 at the time the mixed light is measured are $I_1$, $I_2$, and $I_3$, respectively, the following relation holds irrespective of the intensity:

$$I_1 = C_0(I_{1R} + C_1 I_{1G} + C_2 I_{1B})$$

$$I_2 = C_0(I_{2R} + C_1 I_{2G} + C_2 I_{2B})$$

$$I_3 = C_0(I_{3R} + C_1 I_{3G} + C_2 I_{3B}) \quad (8)$$

where $(I_{1R}, I_{2R}, I_{3R})$, $(I_{1G}, I_{2G}, I_{3G})$, and $(I_{1B}, I_{2B}, I_{3B})$ are outputs of the light receiving elements at the time the representative colored lights 2 are independently measured, respectively, and $C_0$ is a factor indicative of the intensity of the mixed light. In these equations, $I_{iR}$, $I_{iG}$, and $I_{iB}$ ($i=1,2,3$) and $I_1$, $I_2$, and $I_3$ (measured values) are known quantities. Accordingly, the mixing ratio can be determined by solving the simultaneous equations including the unknowns $C_0$, $C_1$, and $C_2$. If the spectral distributions of the colored lights constituting the mixed light 1 are considerably close to $P_R(\lambda)$, $P_G(\lambda)$, and $P_B(\lambda)$ stored in the spectral distribution storage unit 7, the mixing ratio of the colored lights can be determined by the equation (8). The mixing ratio operation unit 6a performs operations required to calculate $C_1$ and $C_2$ indicative of the mixing ratio by the use of the equation (8).

Upon determination of the mixing ratio, the spectral distribution $P_{RGB}(\lambda)$ of the mixed light 1 is calculated by the equation (4) based on the spectral distributions $P_R(\lambda)$, $P_G(\lambda)$, and $P_B(\lambda)$ of the representative colored lights 2 stored in the spectral distribution storage unit 7. The spectral distribution operation unit 8 performs this operation. Upon determination of the spectral distribution $P_{RGB}(\lambda)$ of the mixed light 1, the corrected chromaticity operation unit 9 determines the chromaticity (x, y) of the mixed light 1 by the use of the equation (5). The chromaticity is then displayed on the display 10. In the operations performed by the use of the equations (4) and (5), if the spectral distributions of the representative colored lights 2 and those of the colored lights constituting the mixed light 1 differ significantly, there arise errors in measured values of the chromaticity. Accordingly, it is necessary to use the representative colored lights 2 having respective spectral distributions considerably close to those of the colored lights constituting the mixed light 1.

The colorimeter according to this embodiment cannot be used as an ordinary colorimeter for measuring the chromaticity of a light emitted from an arbitrarily selected light source. However, if lights to be measured are restricted to mixed lights each comprising colored lights having spectral distributions close to those of the representative colored lights 2, it is not necessary to make the spectral responsivities of the light receiving unit close to the color matching functions. Accordingly, this kind of colorimeter can conveniently measure the chromaticity of any mixed light irrespective of the mixing ratio of the colored lights.

Theoretically, there are no restrictions except that the spectral responsivities of the three light receiving elements of the light receiving unit 3 differ from one another. However, if the characteristics of individual light receiving elements are close to one another, the differences among $I_1$, $I_2$, and $I_3$ become small. As a result, when the simultaneous equations (8) are solved, the measurement errors are disadvantageously enlarged. Accordingly, in order to raise the accuracy, it is preferable to employ light receiving elements having respective spectral responsivities as different as possible. The best light receiving elements have respective maximum sensitivities in the proximity of the peaks in spectral distributions of the colored lights constituting the mixed light 1.

Figure 5:
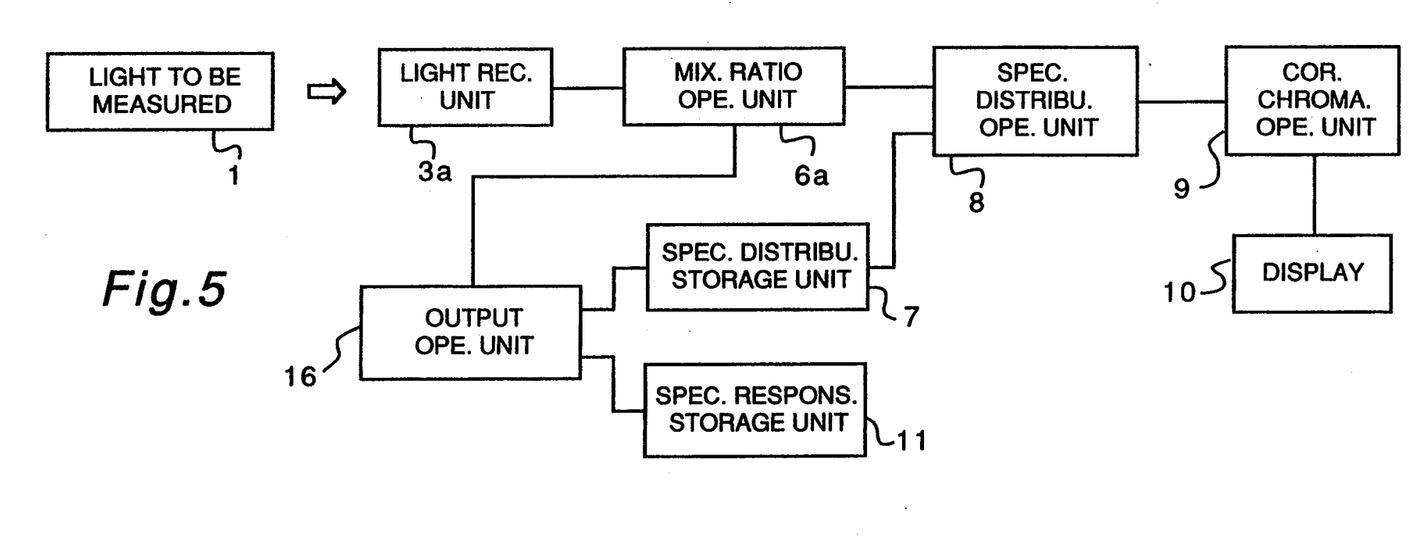
FIG. 5 is a diagram similar to FIG. 1 according to a fifth embodiment of the present invention.

FIG. 5 schematically depicts the organization of a colorimeter according to a fifth embodiment of the present invention. Unlike the colorimeter according to the fourth embodiment, the colorimeter according to this embodiment does not require the representative colored lights 2 and is further provided with a spectral responsivity storage unit 11 and a light-receiving-unit output operation unit 16 for performing operations required to determine outputs of the light receiving elements. The colorimeter according to this embodiment can achieve the same functions as those of the colorimeter according to the fourth embodiment without requiring the representative colored lights 2.

In FIG. 5, the light receiving unit 3a has three different spectral responsivities, which are not rendered to be close to the color matching functions. The spectral responsivities $S_1(\lambda)$, $S_2(\lambda)$, and $S_3(\lambda)$ of the light receiving elements of the light receiving unit 3a are stored in the spectral responsivity storage unit 11. The spectral distribution data $P_R(\lambda)$, $P_G(\lambda)$, and $P_B(\lambda)$ of the colored lights constituting the mixed light 1 or the representative colored lights having spectral distributions close thereto are stored in the spectral distribution storage unit 7. If the colored lights constituting the mixed light 1 or the representative colored lights are individually measured, outputs $(I_{1R}, I_{2R}, I_{3R})$, $(I_{1G}, I_{2G}, I_{3G})$, and $(I_{1B}, I_{2B}, I_{3B})$ of the light receiving elements are given by:

$$I_{iR} = \int_0^\infty P_R(\lambda) S_i(\lambda) d\lambda$$

$$I_{iG} = \int_0^\infty P_G(\lambda) S_i(\lambda) d\lambda \quad (i = 1,2,3)$$

$$I_{iB} = \int_0^\infty P_B(\lambda) S_i(\lambda) d\lambda$$

(9)

These operations are performed by the light-receiving-unit output operation unit 16. Furthermore, the unknowns $C_1$ and $C_2$ indicative of the mixing ratio of the colored lights can be determined by solving the simultaneous equations (8). These operations are performed by the mixing ratio operation unit 6a. Upon determination of the mixing ratio, the chromaticity of the mixed light 1 is calculated by the spectral distribution operation unit 8 and the corrected chromaticity operation unit 9, as in the fourth embodiment. Special attention should be given to the spectral responsivities of the light receiving elements, as in the fourth embodiment.

It is to be noted here that $S_1(\lambda)$, $S_2(\lambda)$, and $S_3(\lambda)$ are values measured as the absolute spectral responsivities. This method can determine not only the mixing ratio of a mixed light of three different colors but that of a mixed light of any number of different colors by the use of the same number of light receiving elements.

In the above-described first to fifth embodiments, when the spectral distribution data of the representative colored lights stored in the spectral distribution storage unit 7 and the spectral distributions of the colored lights constituting the mixed light 1 greatly differ from each other, there arise errors in corrected values and sufficient error-correction effects cannot be obtained. In this case, it is necessary to store the spectral distribution data of plural sets of representative colored lights in the spectral distribution storage unit 7 to selectively output them.

As is clear from the above, the colorimeter according to the present invention can perform self-correction with respect to errors caused by the deviations of the spectral responsivities of the light receiving unit from the color matching functions irrespective of the mixing ratio of a mixed light comprising the three primary colors. Furthermore, it is possible to make the colorimeter have the photometric quantity measurement function capable of automatically calculating the color correction factor with respect to the mixed light of the three primary colors to correct the photometric quantity. As a result, it is possible to realize an error self-correction type high accuracy colorimeter, which is practically useful in measuring the chromaticity or luminance of a color display or the like.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A colorimeter for color displays comprising:
a light receiving means having three kinds of spectral responsivities close to color matching functions;
a tristimulus values operation means for performing operations required to calculate tristimulus values based on outputs from said light receiving means;
a chromaticity operation means for performing operations required to calculate a chromaticity based on outputs from said tristimulus values operation means;
a spectral distribution storage means for storing spectral distributions of representative colored lights of red, green, and blue;
a mixing ratio operation means for performing operations required to calculate a mixing ratio of a mixed light including colored lights of red, green, and blue and mixed at an arbitrary ratio based on outputs from said chromaticity operation means at the time said mixed light is received by said light receiving means and outputs from said tristimulus values operation means at the time said representative colored lights of red, green, and blue are individually received by said light receiving means;
a spectral distribution operation means for performing operations required to calculate a spectral distribution of said mixed light based on outputs from said mixing ratio operation means and outputs from said spectral distribution storage means; and
a corrected chromaticity operation means for performing operations required to calculate a corrected chromaticity of said mixed light based on outputs from said spectral distribution operation means.

2. The colorimeter according to claim 1 further comprising a spectral responsivity storage means for storing the spectral responsivities of said light receiving means and a measured tristimulus values operation means for performing operations required to calculate measured tristimulus values of said representative colored lights of red, green, and blue based on outputs from said spectral responsivity storage means and the outputs from said spectral distribution storage means, wherein outputs from said measured tristimulus values operation means and the outputs from said chromaticity operation means are inputted into said mixing ratio operation means.

3. The colorimeter according to claim 2 further comprising a photometric quantity operation means for outputting a photometric quantity based on the outputs from said light receiving means, a color correction factor operation means for performing operations required to calculate a color correction factor of outputs of said photometric quantity operation means with respect to said mixed light based on the outputs from said spectral distribution operation means and the outputs from said spectral responsivity storage means, and a photometric quantity correction means for correcting the outputs from said photometric quantity operation means by use of outputs from said color correction factor operation means.

4. The colorimeter according to claim 1 wherein said spectral distribution storage means stores and selectively outputs the spectral distributions of plural sets of representative colored lights of red, green, and blue.

5. The colorimeter according to claim 2 wherein said spectral distribution storage means stores and selectively outputs the spectral distributions of plural sets of representative colored lights of red, green, and blue.

6. The colorimeter according to claim 3 wherein said spectral distribution storage means stores and selectively outputs the spectral distributions of plural sets of representative colored lights of red, green, and blue.

7. A colorimeter for color displays comprising:
a light receiving means having three different spectral responsivities;
a spectral distribution storage means for storing spectral distributions of representative colored lights of red, green, and blue;
a mixing ratio operation means for performing operations required to calculate a mixing ratio of a mixed light including colored lights of red, green, and blue and mixed at an arbitrary ratio based on outputs from said light receiving means at the time said mixed light is received by said light receiving means and outputs from said light receiving means at the time said representative colored lights of red, green, and blue are individually received by said light receiving means;

a spectral distribution operation means for performing operations required to calculate a spectral distribution of said mixed light based on outputs from said mixing ratio operation means and outputs from said spectral distribution storage means; and a corrected chromaticity operation means for performing operations required to calculate a corrected chromaticity of said mixed light based on outputs from said spectral distribution operation means.

8. The colorimeter according to claim 7 wherein said spectral distribution storage means stores and selectively outputs the spectral distributions of plural sets of representative colored lights of red, green, and blue.

9. A colorimeter for color displays comprising:

a light receiving means having three different spectral responsivities;

a spectral distribution storage means for storing spectral distributions of representative colored lights of red, green, and blue;

a spectral responsivity storage means for storing the spectral responsivities of said light receiving means;

a light-receiving-means output operation means for performing operations required to calculate outputs from said light receiving means at the time said representative colored lights of red, green, and blue are individually received by said light receiving means based on outputs from said spectral distribution storage means and outputs from said spectral responsivity storage means;

a mixing ratio operation means for performing operations required to calculate a mixing ratio of a mixed light mixed at an arbitrary ratio based on outputs from said light receiving means at the time said mixed light is received by said light receiving means and outputs from said light-receiving-means output operation means;

a spectral distribution operation means for performing operations required to calculate a spectral distribution of said mixed light based on outputs from said mixing ratio operation means and outputs from said spectral distribution storage means; and a corrected chromaticity operation means for performing operations required to calculate a corrected chromaticity of said mixed light based on outputs from said spectral distribution operation means.

10. The colorimeter according to claim 9 wherein said spectral distribution storage means stores and selectively outputs the spectral distributions of plural sets of representative colored lights of red, green, and blue.

* * * * *